US012619139B1

(12) United States Patent
Watts

(10) Patent No.: US 12,619,139 B1
(45) Date of Patent: May 5, 2026

(54) PROJECTOR ASSEMBLY

(71) Applicant: Titus Gadwin Watts, San Francisco, CA (US)

(72) Inventor: Titus Gadwin Watts, San Francisco, CA (US)

( * ) Notice: Subject to any disclaimer, the term of this patent is extended or adjusted under 35 U.S.C. 154(b) by 403 days.

(21) Appl. No.: 18/117,881

(22) Filed: Mar. 6, 2023

Related U.S. Application Data

(60) Provisional application No. 63/296,388, filed on Jan. 4, 2022.

(51) Int. Cl.
  *G03B 21/42* (2006.01)
  *G03B 21/44* (2006.01)
(52) U.S. Cl.
  CPC ............. *G03B 21/42* (2013.01); *G03B 21/44* (2013.01)
(58) Field of Classification Search
  CPC ................................ G03B 21/42; G03B 21/44
  USPC ......................................................... 352/124
  See application file for complete search history.

(56) References Cited

U.S. PATENT DOCUMENTS 3,350,980 A * 11/1967 Margolin ............... G03B 15/12
                                                        352/138
3,765,755 A * 10/1973 Samuels .............. G03B 21/115
                                                        353/101
3,997,255 A * 12/1976 Van Oosten ........... G03B 21/00
                                                        353/78
7,152,440 B1 * 12/2006 Austin ................ E05B 73/0005
                                                        70/164

* cited by examiner

*Primary Examiner* — Jerry L Brooks
(74) *Attorney, Agent, or Firm* — Plager Schack LLP; Mark H. Plager; Kara K. Verryt

(57) ABSTRACT

A projector assembly is configured to continue reeling film when there is a break in the film. The projector assembly has an upper projector joined to a top snorkel with a top mirror. A top lens box mirror is attached to the top snorkel proximate a bottom lens box mirror. A bottom lens to a second projector is aligned with the bottom lens box mirror. A locking assembly has a rising door with a pressure release arranged proximate to a slide plate joined to a slide arm. A motor and a release lever are joined to the slide arm. Film is rounded through the locking assembly such that when the film tears the locking assembly continues to route film through the projector to enable the projector assembly to continue reeling the film.

2 Claims, 7 Drawing Sheets

PROJECTOR ASSEMBLY

RELATED APPLICATION

This application claims priority to provisional patent application U.S. Ser. No. 63/296,388 filed on Jan. 4, 2022, the entire contents of which is herein incorporated by reference.

BACKGROUND

The embodiments herein relate generally to large format film projectors.

Prior to embodiments of the disclosed invention if film were stuck in front of a lens of a film projector, the film projector would break the film. Embodiments of the disclosed invention solve this problem.

SUMMARY

A projector assembly is configured to continue reeling film when there is a break in the film. The projector assembly has an upper projector joined to a top snorkel with a top mirror. A top lens box mirror is attached to the top snorkel proximate a bottom lens box mirror. A bottom lens to a second projector is aligned with the bottom lens box mirror. A locking assembly has a rising door with a pressure release arranged proximate to a slide plate joined to a slide arm. A motor and a release lever are joined to the slide arm. Film is rounded through the locking assembly such that when the film tears the locking assembly continues to route film through the projector to enable the projector assembly to continue reeling the film.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
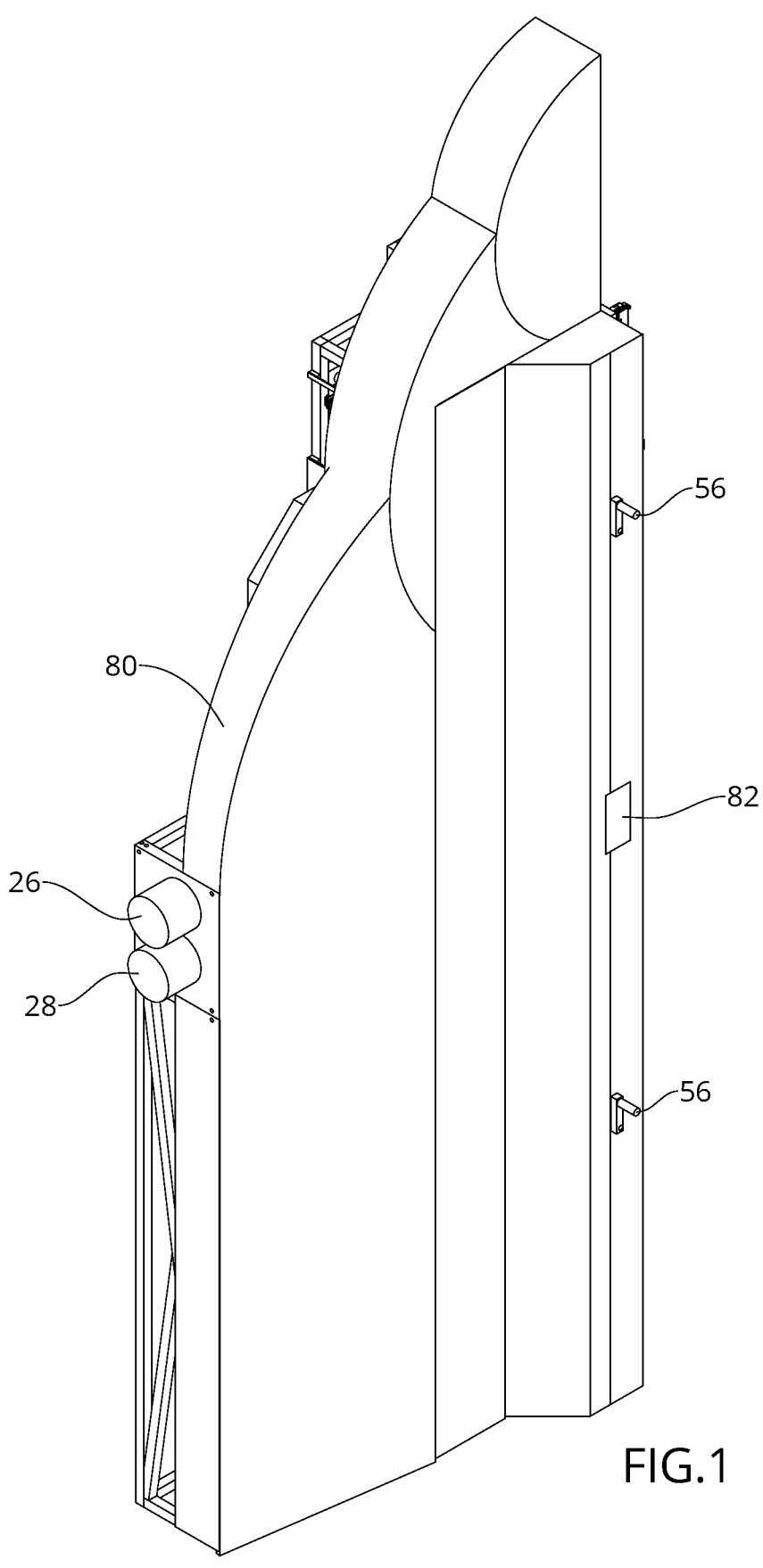
FIG. 1 shows a perspective view of one embodiment of the present invention.
Figure 2:
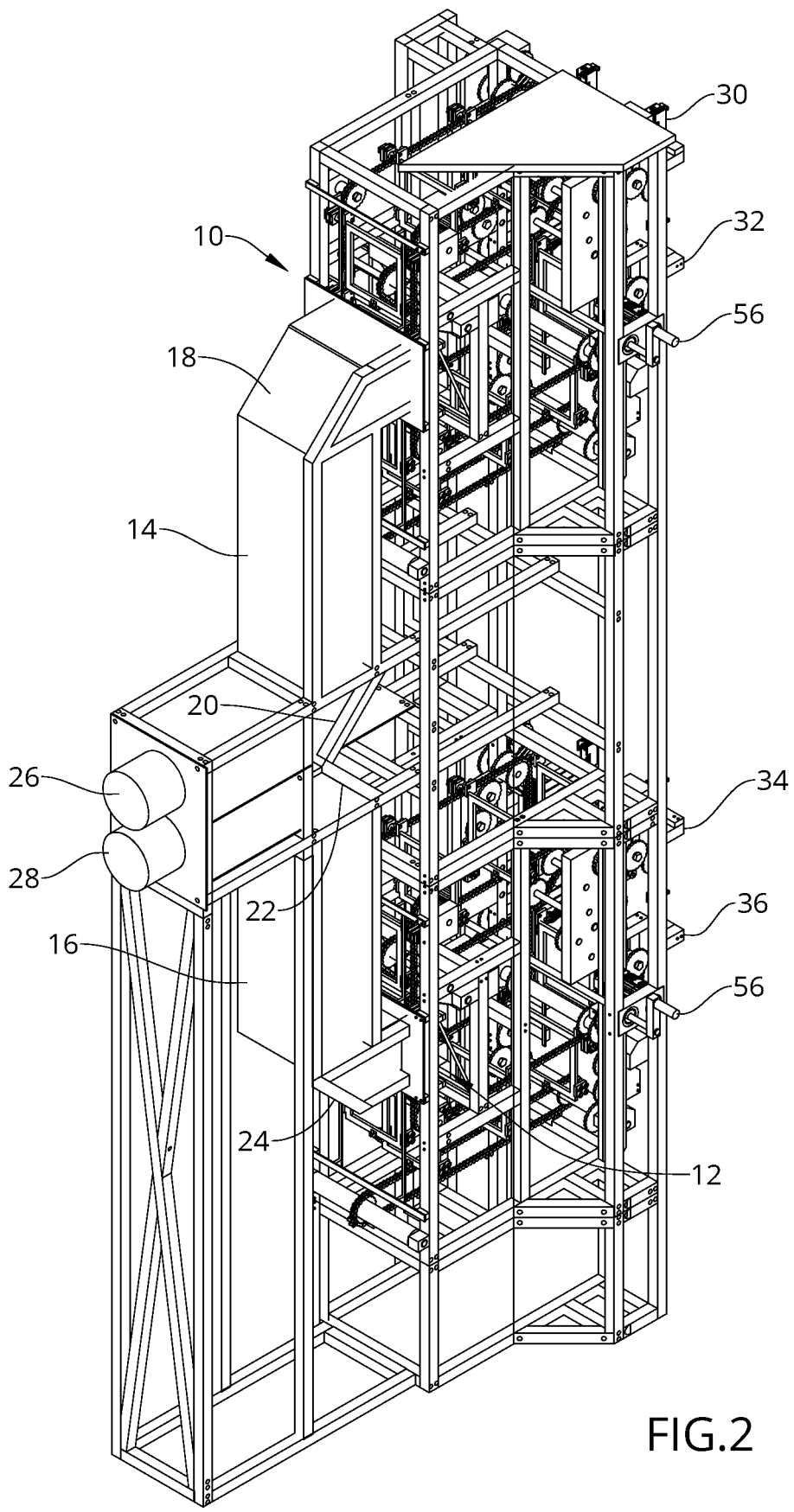
FIG. 2 shows a perspective view of one embodiment of the present invention.
Figure 3:
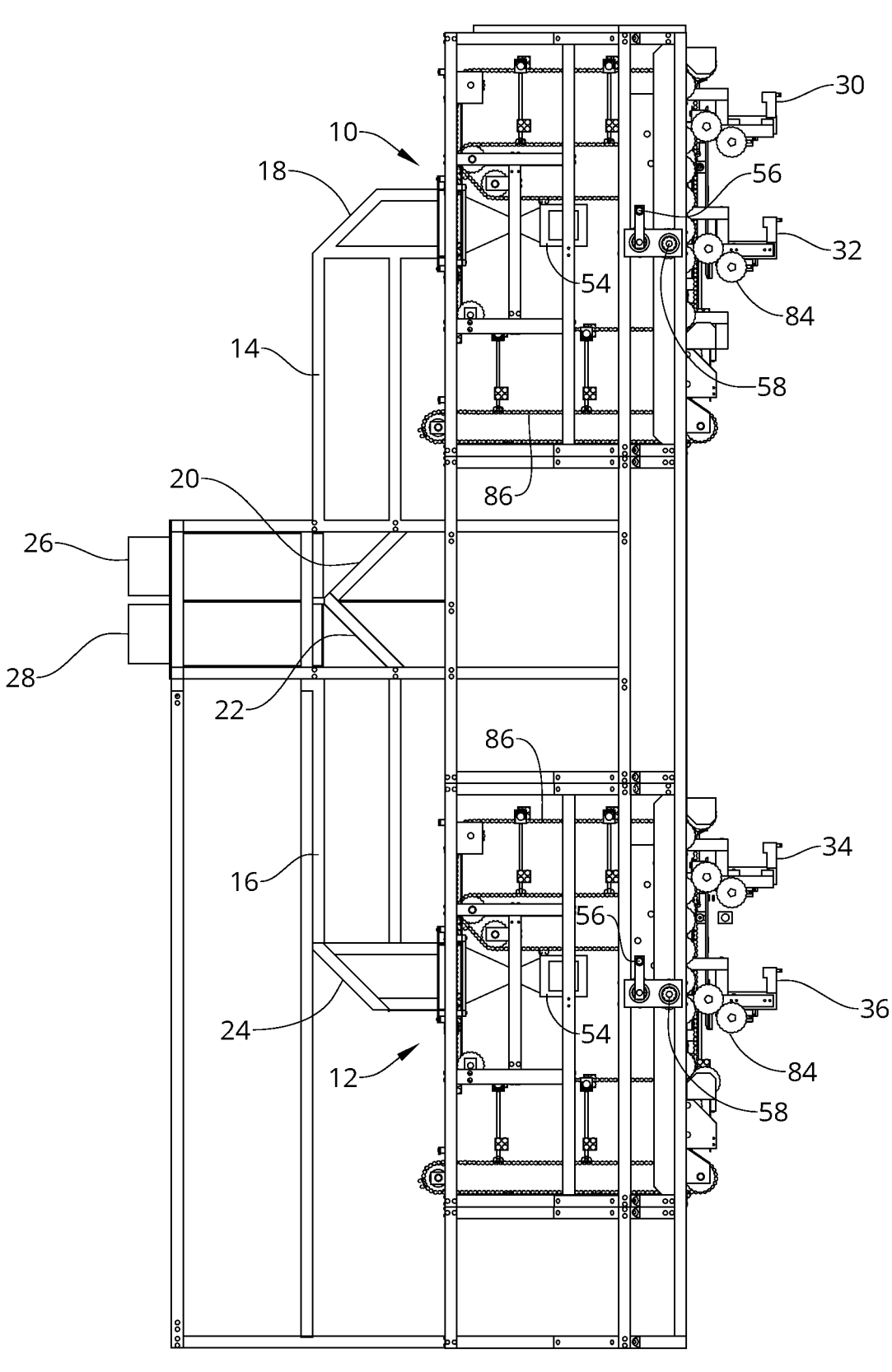
FIG. 3 shows a side view of one embodiment of the present invention.
Figure 4:
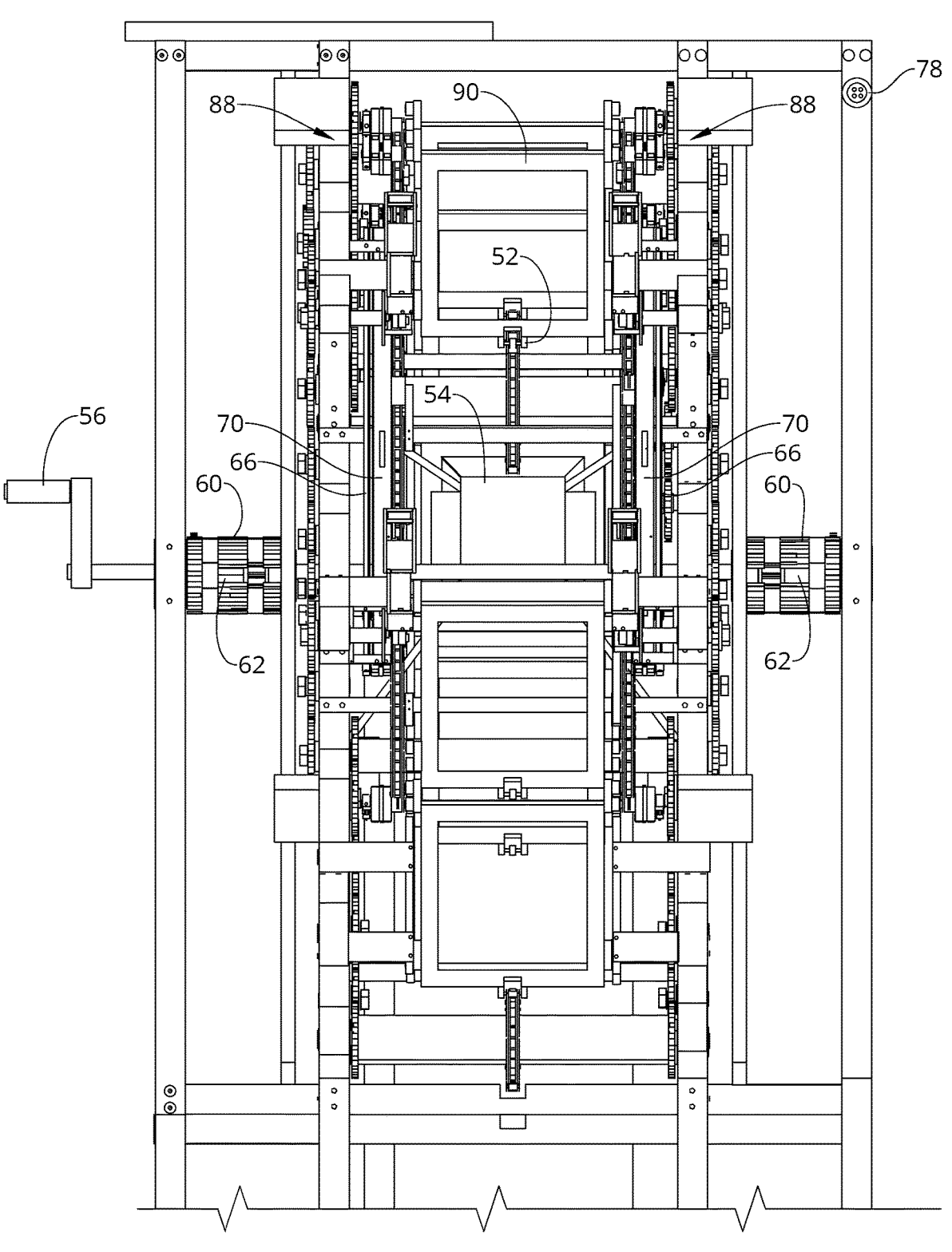
FIG. 4 shows a detailed rear view of one embodiment of the present invention.

By way of example, and referring to FIG. 1, one embodiment of a projector assembly comprises an upper projector 10 joined to a top snorkel 14 with a top mirror 18. The top snorkel 14 is attached to a top lens box mirror 20 proximate a bottom lens box mirror 22. The bottom lens box mirror 22 is attached to a bottom snorkel mirror 24. The top lens box mirror 20 is aligned with a top lens to first projector 26. The bottom lens box mirror 22 is aligned with a bottom lens to second projector 28. A lower projector 12 is attached to the bottom snorkel mirror 24.

The projector assembly further comprises a first projector top return film frame bracket 30 joined to a first projector bottom return film frame bracket 32. The projector assembly further comprises a second projector top return film frame bracket 34 joined to a second projector bottom return film frame bracket 36.

Figure 5:
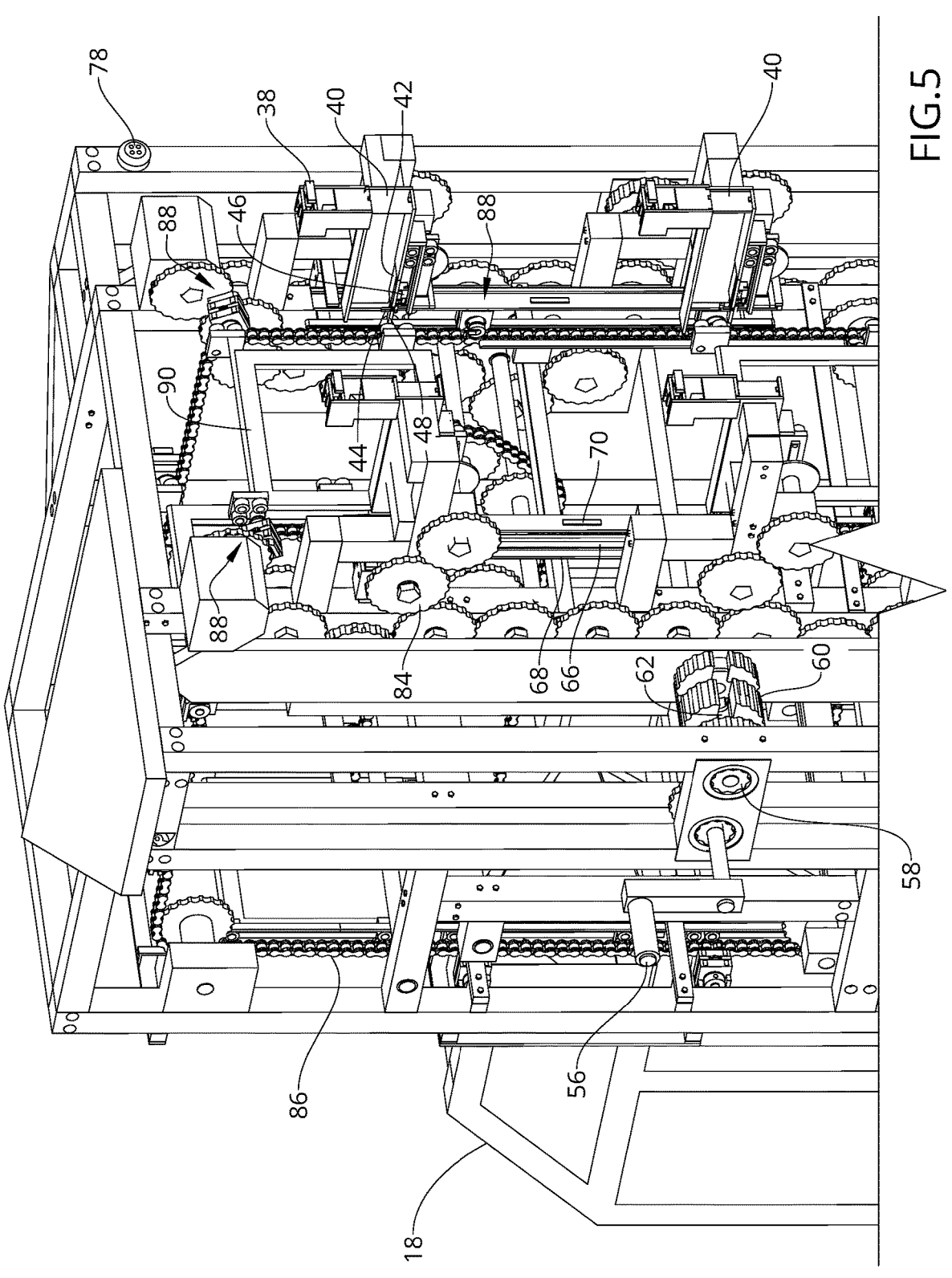
FIG. 5 shows a detailed rear perspective view of one embodiment of the present invention.

The projector assembly further comprises a locking assembly 88. The locking assembly 88 further comprises a rising door 40 with a pressure release 38 arranged proximate to a slide plate 42 adjoined to a slide arm 44. The slide arm is attached to a release lever 48. As shown in FIG. 5, the release lever 48 is triggered with a release spring 47. The release lever 48 moves the slide arm 44 to push the film frames 90 into the locking assembly 88.

The projector assembly further comprises a film frame box holder 52 that surrounds the film. There is a first light box 54 surrounding the upper projector 10. There is a second light box 54 surrounding the lower projector 12.

Film reels can be mounted on a pair of mounting levers 56. Each mounting lever 56 is attached to a mounting lever bearing 58, a bear assembly 60, and a stabilizing assembly 62. In some embodiments the mounting lever 56 can be reinforced with a frame track cushion 64.

The frame track cushion 64 is joined to an L-lever 66 having a bearing press bar 68. The bearing press bar 68 further comprises a set of ridges 70 which mate with release bar 72. The locking assembly 88 can have release bar 72 joined to frame guide locker 74 and gears 76. The locking assembly 88 locks and unlocks the frame guide locker 74, which holds the film frames 90 in place as they rotate through the projector.

Figure 6:
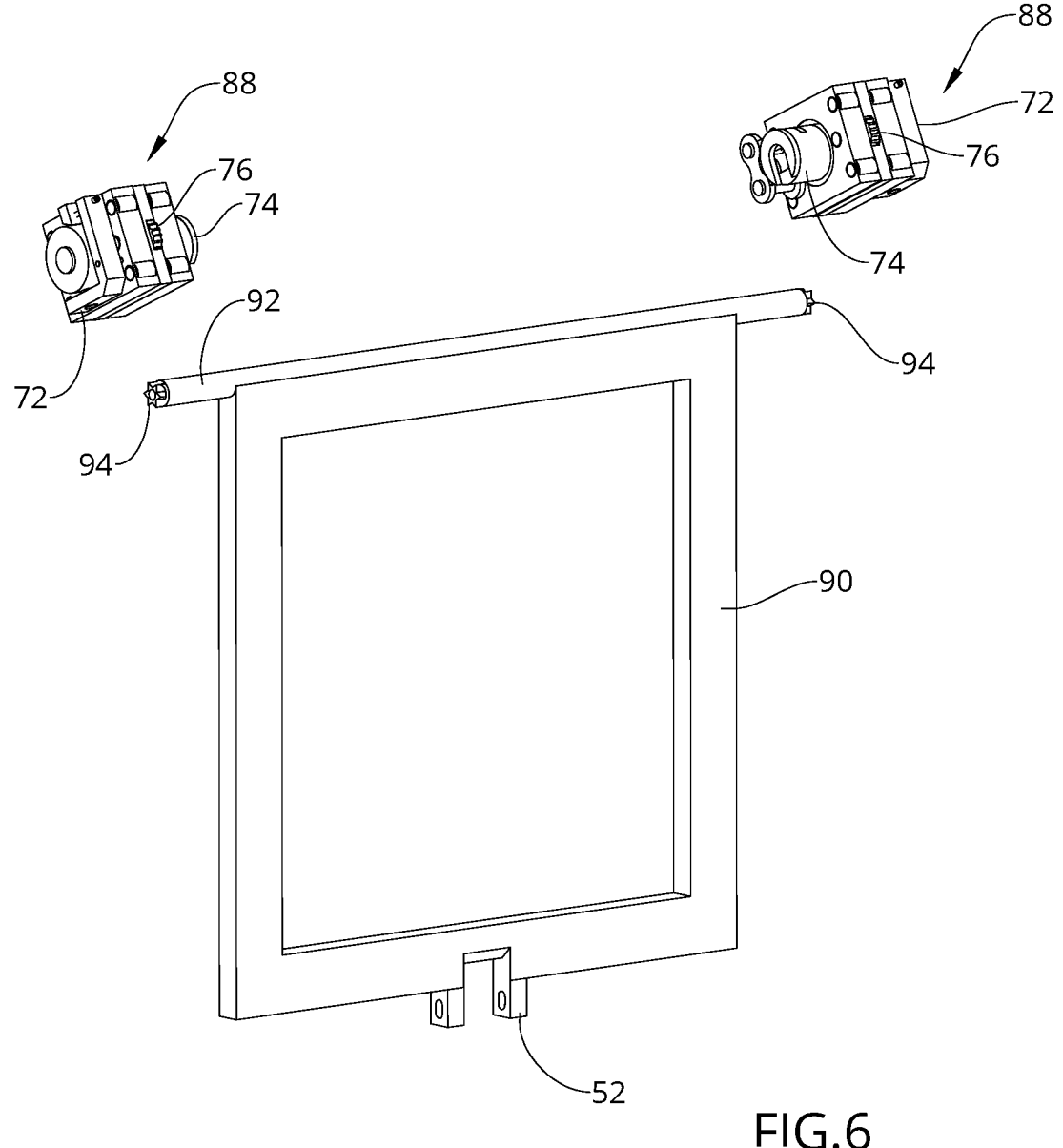
FIG. 6 shows a detailed view of one embodiment of the present invention.
Figure 7:
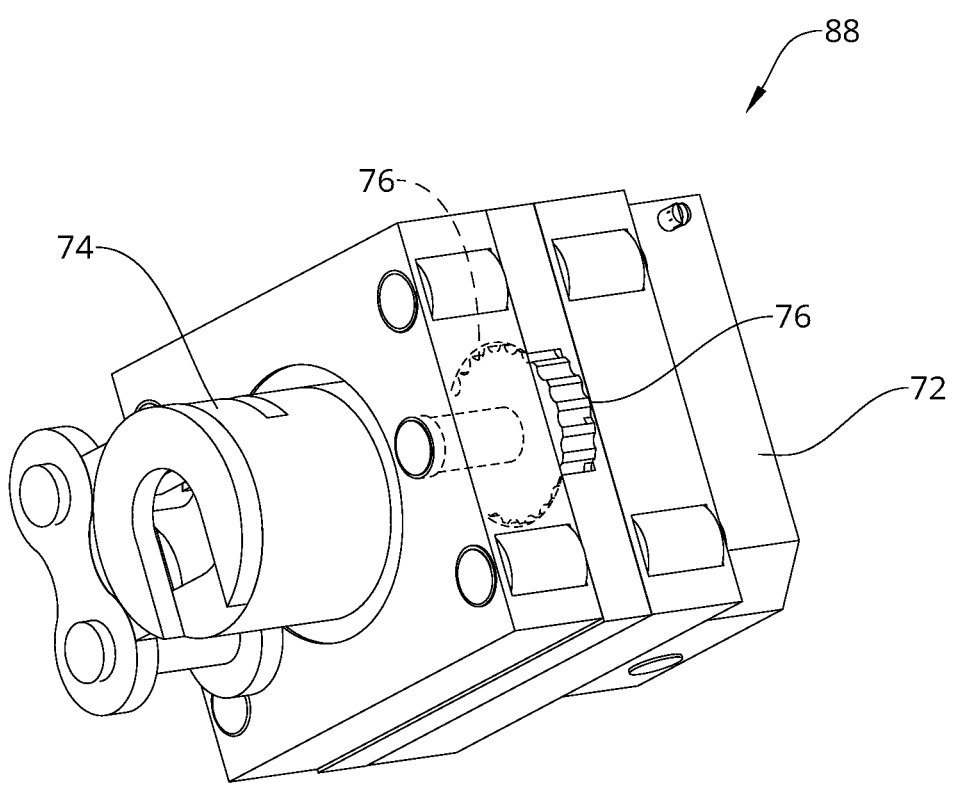
FIG. 7 shows a detailed view of one embodiment of the present invention.
Figure 8:
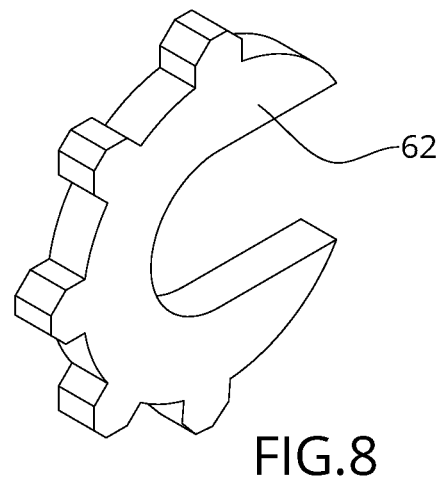
FIG. 8 shows a detailed view of one embodiment of the present invention.

The projector assembly can have a shell 80 having a mobile device controller, with a cable connection to the projector, gears 84, and chains 86 driven by the motors 46 to transport the film frames 90 through the projector. The film frame bottom holder 52 further comprises film frame 90 with frame rod 92 and frame rod gear 94. As shown in FIG. 6, Each film frame 90 is an individual frame, such as a metal frame, configured to house a single frame of cellulose film. Because the projector assembly transports these individual, intact film frames 90, a tear in the cellulose film housed within a given frame does not stop the projector from operating.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A projector assembly, configured to continue reeling film when there is a break in the film; the projector assembly comprising:

an upper projector, joined to a top snorkel with a top mirror;

a top lens box mirror, attached to the top snorkel proximate a bottom lens box mirror;

a bottom snorkel mirror, joined to the bottom lens box mirror with a bottom snorkel;

a top lens to a first projector, aligned with the top lens box mirror;

a bottom lens to a second projector, aligned with the bottom lens box mirror;

a first projector top return film frame bracket, joined to a first projector bottom return film frame bracket;

a second projector top return film frame bracket, joined to a second projector bottom return film frame bracket;

a locking assembly, further comprises a rising door with a pressure release arranged proximate to a slide plate joined to a slide arm;

a release lever; joined to the slide arm, and a motor, operatively coupled to a plurality of chains to transport a plurality of individual film frames through the projector assembly; wherein each film frame is configured to house a frame of cellulose film;

wherein the plurality of individual film is transported through the locking assembly such that when the frame of cellulose film within one of the plurality of film frames tears the locking assembly continues to route the plurality of individual film frames through the projector to enable the projector assembly to continue reeling the film.

2. The projector assembly of claim 1, wherein the release lever is triggered with a release spring.

* * * * *